Patented Aug. 29, 1944

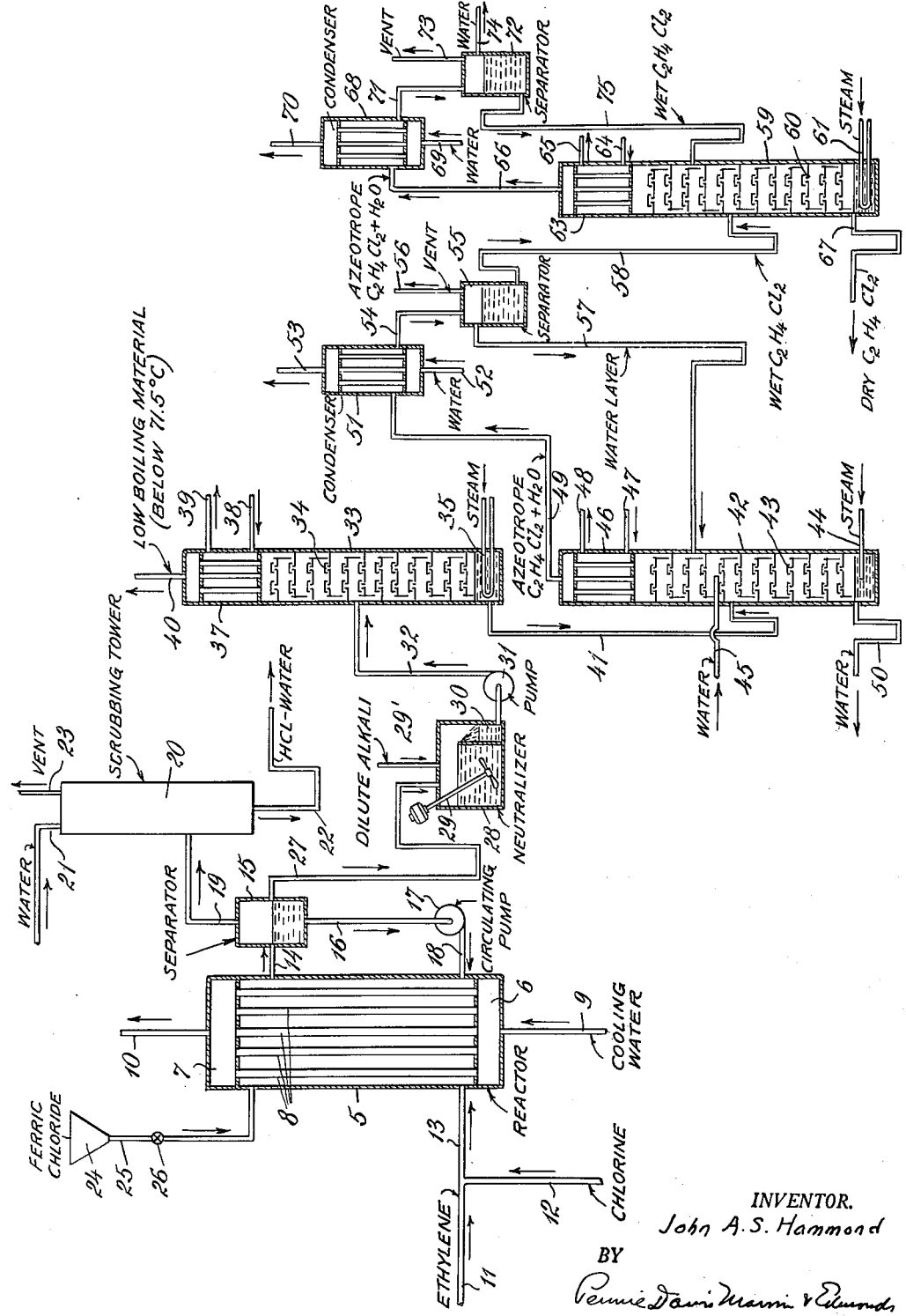

2,356,785

UNITED STATES PATENT OFFICE 2,356,785

MANUFACTURE OF DICHLORETHANE

John A. S. Hammond, Glenbrook, Conn., assignor to U. S. Industrial Chemicals, Inc., New York, N. Y., a corporation of Delaware Application May 24, 1943, Serial No. 488,141

3 Claims. (Cl. 202—42)

This invention relates to the production and purification of dichlorethane or, as it is frequently designated in the trade, ethylene dichloride. Dichlorethane has been prepared heretofore by reacting ethylene and chlorine within a body of liquid dichlorethane. The product of the reaction, after treatment with an aqueous alkali to neutralize any acid present, has been separated into layers, one aqueous and the other containing dichlorethane and water. Upon distillation of the dichlorethane, the first fraction containing the water has been separated and the remainder recovered as anhydrous dichlorethane of commerce.

This commercial dichlorethane contains certain impurities in minute proportions. The exact nature of the impurities is not known, but their presence renders the product unstable during storage and shipment and unsuitable for certain uses for example in the manufacture of some types of synthetic rubber.

It is the object of the invention to provide an improved method of purifying crude dichlorethane whereby the impurities mentioned are eliminated and a stable product is obtained.

Other objects and advantages of the invention will be apparent as it is better understood by reference to the following specification and the accompanying drawing, which illustrates diagrammatically an apparatus suitable for the practice of the method.

I have discovered that the impurities present in crude dichlorethane can be removed therefrom in two steps, in the first of which only material boiling below 71.5° C. (the boiling point of the azeotrope of dichlorethane and water) is separated as vapor. The second step consists of distillation with water so regulated that only the azeotrope of dichlorethane and water is withdrawn as vapor. The azeotrope is condensed and wet dichlorethane is separated. The wet dichlorethane can be dried by another distillation to eliminate the water or alternatively by contact with a desiccating material. Evidently the impurities are eliminated in the vapor and water phases respectively of the first and second distillation, since these impurities do not occur in the final product.

In the practice of the invention, I prefer to follow the procedure of my co-pending application Ser. No. 486,993 filed May 14, 1943, in which small amounts of anhydrous ferric chloride, i. e. from approximately 0.05% to 0.25% by weight of the liquid dichlorethane, are added while the ethylene and chlorine are reacting in a body of liquid dichlorethane. The ferric chloride in the relatively minute quantities used acts as a depressant for the substitution reaction, and thus prevents to a large extent the formation of higher chlorinated products such as trichlorethane. By this means I am able to limit the reaction to one of addition, as follows:

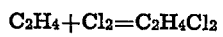

$$C_2H_4 + Cl_2 = C_2H_4Cl_2$$

One of the major impurities in commercial dichlorethane is thus eliminated.

Referring to the drawing, 5 indicates a reactor consisting of a suitable receptacle provided preferably with heads 6 and 7 and tubes extending therethrough to permit circulation of cooling water introduced through a pipe 9 and withdrawn through a pipe 10. Ethylene and chlorine, preferably in the molecular proportions of 1.1:1 are introduced through pipes 11 and 12 and are delivered by a pipe 13 to the reactor 5 which is substantially filled with a body of liquid dichlorethane. The liquid overflows through a pipe 14 to a separator 15. A part of the liquid is withdrawn through a pipe 16 and returned to the reactor 5 by a pump 17 and pipe 18. Vapors from the separator 15 are withdrawn through a pipe 19 and delivered to a scrubbing tower 20. Water may be introduced at the top of the scrubbing tower through a pipe 21 to recover from the vapors hydrochloric acid which may be present. The solution escapes through a pipe 22. The undissolved vapors are delivered through the vent 23. Anhydrous ferric chloride, preferably in the form of an alcohol solution, is delivered in the required proportions from a receptacle 24 through a pipe 25 controlled by a valve 26 to the reactor 5. Since a portion of the dichlorethane is withdrawn continuously, ferric chloride must be added similarly to maintain the required proportion in the reactor 5.

A portion of the dichlorethane is withdrawn from the separator 15 through a pipe 27 and is delivered to a neutralizer 28 preferably provided with an agitator 29. An aqueous solution of an alkali such as sodium hydroxide is introduced through a pipe 29' in the proportions necessary to neutralize any acid present and also to decompose the small amount of ferric chloride which remains in the dichlorethane. The dichlorethane overflows to a compartment 30 and is delivered by a pump 31 and pipe 32 to the middle portion of a column 33 provided with plates or trays 34. The bottom of the column is heated by steam passing through a coil 35. A condenser 37 is provided at the top of the column and is cooled by water circulating through the pipes 38 and 39 to maintain a temperature below 71.5° C., for example approximately 70° C. The condenser prevents vapors consisting of the azeotrope of dichlorethane and water from escaping while low boiling material which may be present is withdrawn as vapor through a pipe 40 and discharged.

The mixture of dichlorethane and water is withdrawn through a pipe 41 and enters the middle portion of another distillation column 42 having plates or trays 43. The column is heated by the introduction of steam through a pipe 44. Water is fed to the top of the column through a pipe 45. The top of the column is provided with a condenser 46 which is maintained by circulation of water through pipes 47 and 48 at a temperature of 71.5° C., thus permitting withdrawal of the azeotrope of diethylene chloride and water as vapor at the top of the column through a pipe 49. Sufficient water is introduced through the pipe 45 to ensure the withdrawal of all of the dichlorethane, and water and impurities are withdrawn through a pipe 50 at the bottom of the column.

The vapor, consisting of the azeotrope of dichlorethane and water, is delivered by the pipe 49 to a condenser 51 through which water is circulated by pipes 52 and 53. The condensed azeotrope is delivered by a pipe 54 to a separator 55 provided with a vent 56. In the separator the condensate settles in two layers, the upper of which is principally water which is withdrawn through a pipe 57 and returned to the upper part of the column 42. The lower layer, consisting of wet dichlorethane, escapes through a pipe 58 to a column 59 having plates or trays 60. The column is heated at the bottom by steam introduced through a coil 61. The column is provided with a condenser 63 maintained, by circulation of water through pipes 64 and 65, at a temperature of 71.5° C. The azeotrope of diethylene chloride and water is separated as vapor which escapes through a pipe 66, and dry dichlorethane is withdrawn through a pipe 67 at the bottom of the column. The azeotrope is delivered to a condenser 68 cooled by water circulated through the pipes 69 and 70. The condensate is withdrawn through a pipe 71 and delivered to a separator 72 having a vent 73. The upper water layer is discharged through a pipe 74. The lower layer, consisting of wet dichlorethane, is withdrawn through a pipe 75 and delivered to the upper part of the column 59. The column is so operated as to continuously deliver dry dichlorethane at the bottom, and the product is free from the impurities mentioned and consequently stable in storage and shipment.

In place of the column 59, and the distillation conducted therein, I may utilize a similar column which may be filled with pieces of a suitable desiccating agent such as sodium or potassium hydroxide. In that event, the condenser 68 and the separator 72, with their pipe connections, are eliminated. The wet dichlorethane percolates upward through the desiccating agent, which removes water therefrom. Dry dichlorethane is withdrawn at the top of the column and is free from the impurities mentioned. It is a stable product which may be stored and shipped. It is suitable for purposes for which the dichlorethane of commerce, as now available, cannot be utilized.

Various changes may be made in the procedure and in the apparatus employed without departing from the invention or sacrificing the advantages thereof.

I claim:

1. The method of purifying crude dichlorethane which comprises neutralizing the acid therein, heating the dichlorethane to vaporize and remove material having a boiling point below 71.5° C., distilling the dichlorethane with sufficient water to vaporize and separate all of the dichlorethane as the azeotrope of dichlorethane and water boiling at 71.5° C., condensing the azeotrope vapor, separating the condensate into a watery layer and a layer consisting of wet dichlorethane, and removing the water from the wet dichlorethane.

2. The method of purifying crude dichlorethane which comprises neutralizing the acid therein, heating the dichlorethane to vaporize and remove material having a boiling point below 71.5° C., distilling the dichlorethane with sufficient water to vaporize and separate all of the dichlorethane as the azeotrope of dichlorethane and water boiling at 71.5° C., condensing the azeotrope vapor, separating the condensate into a watery layer and a layer consisting of wet dichlorethane, and again distilling the wet dichlorethane to remove the water and dichlorethane as the azeotrope leaving a residue of dry dichlorethane.

3. The method of purifying crude dichlorethane which comprises neutralizing the acid therein, heating the dichlorethane to vaporize and remove material having a boiling point below 71.5° C., distilling the dichlorethane with sufficient water to vaporize and separate all of the dichlorethane as the azeotrope of dichlorethane and water boiling at 71.5° C., condensing the azeotrope vapor, separating the condensate into a watery layer and a layer consisting of wet dichlorethane, and dehydrating the wet dichlorethane by contact with a solid alkali metal hydroxide.

JOHN A. S. HAMMOND.